No. 744,454. PATENTED NOV. 17, 1903.
O. ALLEN.
FISHING REEL.
APPLICATION FILED JULY 14, 1903.
NO MODEL.
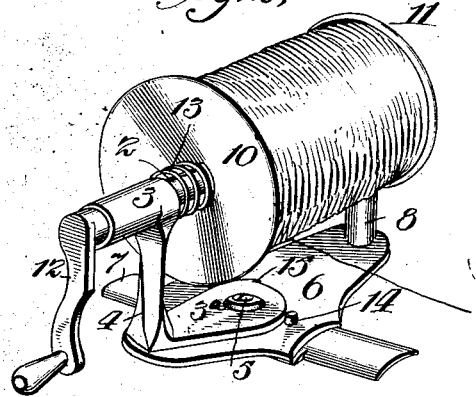
WITNESSES:
G. P. Kingsbury
Aurel W. Hart
INVENTOR
Oscar Allen,
BY Munn & Co.
ATTORNEYS.

No. 744,454.

Patented November 17, 1903.

UNITED STATES PATENT OFFICE.

OSCAR ALLEN, OF LINCOLN, ILLINOIS.

FISHING-REEL.

SPECIFICATION forming part of Letters Patent No. 744,454, dated November 17, 1903.

Application filed July 14, 1903. Serial No. 165,446. (No model.)

*To all whom it may concern:*

Be it known that I, OSCAR ALLEN, a citizen of the United States, and a resident of Lincoln, in the county of Logan and State of Illinois, have made certain new and useful Improvements in Fishing-Reels, of which the following is a specification.

Fishing-reels are ordinarily so constructed that the spool rotates in fixed bearings, and in casting the line is delivered from the spool, which is made to revolve with minimum friction. It is necessary, however, that a slight brake shall be applied to the reel, and this is commonly done by the thumb of the angler. It requires the utmost skill to apply the pressure to the exact degree necessary to prevent the spool from revolving faster than the bait flies and the line runs out, and consequently a slack occurs in the line, and it is liable to be wound on the spool in the contrary direction to that in which it was originally wound. In other words, what is called "backlashing" occurs by the overrunning of the spool, and thus the cast or flight of the bait is suddenly arrested, and often, when this occurs, the bait is separated from the hook and is lost. The line must then be drawn off the spool, and frequently it is so tangled as to require considerable time to straighten out.

It is the object of my invention to avoid these results and to enable the line to be delivered from the spool without any danger of overrunning and without the necessity of applying the brake. Further, the line is delivered more freely or rapidly than from the ordinary reel and a longer cast may be made. I effect these results by so mounting the spool upon the reel-seat that it may be revolved bodily thereon a quarter of a circle, so that in casting it occupies a position in which its axis or shaft is parallel to that of the rod, the line being thus rendered from the forward end of the spool. Thus while the delivery of the line is very easy it cannot be delivered faster than the bait is cast or flies, since the weight of the bait is the only factor-producing motion of the line, and the only friction to be overcome is the very slight one incident to reeling of the line from the spool and its passage through the rings or guides of the rod. It will be understood that in the operation of casting the spool does not revolve and that when the cast has been made the spool is turned back to its normal position at right angles to the axis of the rod and is used for reeling in the line in the usual way.

The details of construction, arrangement, and operation are as hereinafter described, and illustrated in the accompanying drawings, in which—

Figure 1 is a perspective view illustrating the practical use of my invention. Fig. 2 is a perspective view of the reel with the spool arranged in the normal position. Fig. 3 is a perspective view of the reel with the spool arranged parallel to the rod as required for casting. Fig. 4 is a transverse section of the reel.

The spool proper, 1, is provided at one end with a shaft or axis 2, which is journaled in an elongated bearing 3, formed at the top of a pivoted post 4. The latter is constructed in the form of an elbow or right angle, its horizontal base or arm 3ª being pivoted by a screw or rivet 5 to the cross-plate 6 and reel-plate 7. As shown, the cross-plate 6 is arranged at right angles to the reel-plate proper, 7, and firmly secured thereto by brazing or in any other suitable manner. The plate 7 has the usual construction by which it is adapted to be secured to a reel-seat on a rod in the usual manner. The cross-plate 6 is provided with a fixed post 8, having at its upper end a socket to receive the pivot or trunnion 9 of the spool 1. The spool has a head 10 of the usual size, but the opposite head or end plate 11 is of less diameter. The shaft 2 may in practice be extended through the body of the spool and project from the head 11 and form the pivot 9, as indicated by dotted lines in Fig. 4. The reel-plate 7, cross-plate 6, and post 8 may also be cast or formed integrally, if desired. A crank 12 is applied to the outer end of the shaft 2 for use in rotating the spool as required for winding on the line. In winding on the spool is held and arranged in the usual way, as represented in Figs. 2 and 4—that is to say, crosswise of or at right angles to the reel-plate 7. Between the enlarged head 10 of the spool and the elongated bearing 3 there is arranged a spiral or coil spring 13, as shown in Figs. 2 and 4. It will now be seen that by pulling the spool to the left, as indicated in Fig. 4, the spring 13 will be compressed and the pivot 9 will be withdrawn from the fixed post 8, so that the spool may be turned into the position indicated in Figs. 1 and 3—that is to say, by seizing the crank 12 and pulling in the direction of the shaft 2 the spool will be retracted to the position indicated by dotted lines in Fig. 4 and may then be swung a quarter around, so as to come into parallelism with the reel-plate 7 and the rod to which it is attached. In this operation the pivoted arm 4 necessarily rotates on the pin 5. In order to arrest the movement at the right point, I provide a stop 14, consisting of a stud, (see Figs. 2 and 3,) which is set in the cross-plate 6 and engages a shoulder 15, formed on the arm 3ª of the pivoted post 4.

When the angler desires to make a cast, the spool is rotated to wind the line on the same until the bait is suspended close to the tip of the rod, and then the spool is turned parallel with the rod, as shown in Fig. 1. The cast is then made by swinging the rod through a vertical or horizontal arc, and the line is released and begins to run out the instant the rod passes beyond the vertical position. It will be understood that initially the line must be secured and held until the rod is swung to the vertical position, and this may be effected by drawing off a portion of the line and holding it by means of the thumb. It is also practicable to place the forefinger alongside the spool and to thus hold the line so that it cannot reel off until pressure of the finger is released. It will be seen that the line passes off the spool without rotating the latter, and consequently there is no overrunning and no "backlash" possible, and hence no tangle can occur. Further, the line runs out so easily or with so little friction that a longer cast may be made than is practicable with a reel held in the usual position and rotated by the traction of the line. Immediately that the cast has been made the angler shifts the spool back to its normal position, as indicated in Figs. 2 and 4, and the reel is then used in the usual manner until another cast is to be made.

What I claim is—

1. A fishing-reel, comprising a reel-plate, a reel-supporting post which is pivoted on said plate and provided at its upper end with an elongated bearing, the spool proper provided with a shaft arranged in said bearing and having at its outer end a crank for rotating it, the said bearing being thus interposed between the crank and spool as described.

2. A shaft-reel comprising a reel-plate and a post which is pivoted and adapted to be turned on its axis, a spool and a shaft therefor which is journaled in such pivoted post, and a fixed post which the spool-shaft is adapted to engage and disengage substantially as described.

3. The improved fishing-reel comprising a reel-plate having a lateral extension, and a post fixed in the latter, a rotatable spool having a shaft provided with a crank, and a bearing for said shaft which is pivoted upon the reel-plate, whereby the reel is adapted to be held at right angles to the reel-plate for use in the usual way and to be shifted a quarter around, or into parallelism with the reel-plate, one end of the spool being thus left free so that the line may be drawn off therefrom, substantially as described.

4. In a fishing-reel, the combination, with the reel-plate having a lateral extension and a fixed post, of the rotatable spool having a shaft, a crank for rotating the spool, and a pivoted bearing in which said shaft is arranged, the bearing having an angular form and its horizontal base portion pivoted to the reel-plate, and a spring interposed between such bearing and the adjacent head of the spool, whereby the latter is adapted to be retracted to free its outer pivot from the fixed post and enable it to be swung into parallelism with the reel-plate, as required to enable the line to pass freely off the end of the spool, substantially as described.

5. In a fishing-reel, the combination, with the reel-plate having a lateral extension and a stop and fixed post, of the rotatable spool having a shaft and crank, and an angular post which is pivoted to the reel-plate and provided with a shoulder for engaging with the aforesaid stop, when the reel is shifted from its normal rotatable position into parallelism with the reel-plate, substantially as described.

OSCAR ALLEN.

Witnesses:
 GEORGE SIGMUND SELREID,
 EDWARD NICHLOS CHERNEY.